(12) United States Patent
Ruelke et al.

(10) Patent No.: US 7,474,711 B2
(45) Date of Patent: Jan. 6, 2009

(54) METHOD AND SYSTEM FOR I/Q IMBALANCE AND DC OFFSET CORRECTION

(75) Inventors: Charles R. Ruelke, Margate, FL (US); Kar Boon Oung, Georgetown (MY); Ting Fook Tang, Bayhan Lepas (MY); Richard S. Young, Weston, FL (US)

(73) Assignee: Motorola, Inc, Schaumburg, IL (US)

( * ) Notice: Subject to any disclaimer, the term of this patent is extended or adjusted under 35 U.S.C. 154(b) by 715 days.

(21) Appl. No.: 11/123,291

(22) Filed: May 6, 2005

(65) Prior Publication Data

US 2006/0251189 A1    Nov. 9, 2006

(51) Int. Cl.
*H03D 3/22* (2006.01)
*H04L 25/10* (2006.01)
*H04L 27/00* (2006.01)
*H04L 27/22* (2006.01)

(52) U.S. Cl. .......... 375/319; 375/324; 375/329
(58) Field of Classification Search .......... 375/317, 375/319, 322, 324, 329
See application file for complete search history.

(56) References Cited

U.S. PATENT DOCUMENTS 5,369,411 A * 11/1994 Lisle, Jr. .......... 342/194
6,765,623 B1   7/2004 Parker

* cited by examiner

*Primary Examiner*—David B Lugo
(74) *Attorney, Agent, or Firm*—Barbara R. Doutre

(57) ABSTRACT

A method for correcting I/Q imbalance in a received signal is disclosed. The method includes the steps of grouping (202) the received signal into a predetermined number of clusters, and determining (204) at least one coefficient value by feeding the predetermined number of clusters into a nested loop. The method further includes computing (206) a compensation value based on the at least one coefficient value, and correcting (208) the I/Q imbalance in the received signal by using the compensation value.

25 Claims, 7 Drawing Sheets

METHOD AND SYSTEM FOR I/Q IMBALANCE AND DC OFFSET CORRECTION

FIELD OF THE INVENTION

This invention relates in general, to communication systems, and more specifically to error correction occurring in a received signal of a communication system.

BACKGROUND OF THE INVENTION

Communication systems utilizing Radio Frequency (RF) signals often convert the received signal into an in-phase (I) component and a quadrature (Q) component. A mismatch in these electrical components in the signal channels causes I/Q imbalances in the received signal. The I/Q imbalances, such as amplitude imbalance and phase imbalance, are frequency-dependent and highly unpredictable. For communication systems where the received signal is converted into its constituent baseband I/Q components (eg: Direct Conversion Receivers), the I/Q mismatch and intrinsic Local Oscillator (LO) self-mixing will introduce a Direct Current (DC) offset error in base-band I/Q signals. These errors degrade the signal quality, hence detection and correction of these errors becomes necessary.

Various methods exist in the art for correcting said I/Q imbalances and DC offset errors. In one method, the I/Q phase and amplitude balance is compensated by using synchronous calibration regions embedded in packet data signals. The amplitude ratio I/Q is calculated directly, and the phase balance is checked for orthogonality in relation to the expected 90 degrees. In another method, the I/Q phase and amplitude imbalance is corrected in real time by using pilot signals that are embedded in the RF carrier. In yet another method, a differentiate-cross-multiply demodulator strategy is used, which utilizes two correction factors. One of the correction factors is scaled as a quotient of the divide operation to minimize distortion.

The methods described above suffer from one or more of the following limitations. First, the methods, while receiving the signals, are not able to eliminate amplitude imbalance, phase imbalance and DC offset errors in real time. Second, the methods are not immune to a highly dynamic RF and parametric environment. Third, some of the methods require pilot signals and cannot operate piece-wise continuously on the actual signal.

Accordingly, there is a need for an improved I/Q imbalance and DC offset correction.

BRIEF DESCRIPTION OF THE DRAWINGS

The present invention is illustrated by way of example and not limitation in the accompanying figures, in which like references indicate similar elements, and in which.

Figure 1:
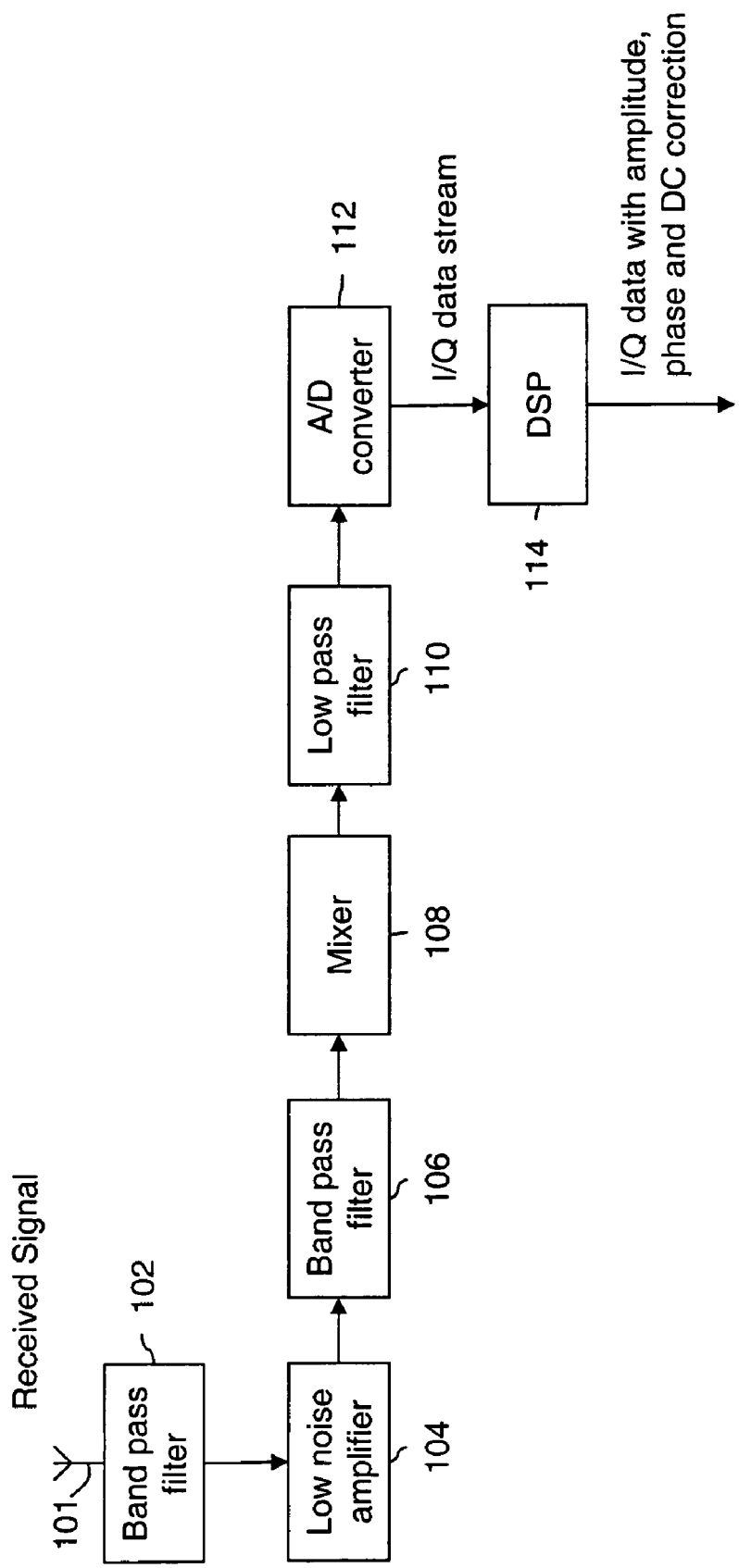
FIG. 1 is a block diagram illustrating the processing of a received signal in a communication system, in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE PREFERRED EMBODIMENTS

Briefly, in accordance with the present invention there is disclosed herein a method for correcting I/Q imbalances in a received signal. The method includes the steps of continuously resolving the received signal into a predetermined number of samples, which are then processed using a nested loop processing structure. The nested loop processes the predetermined number of samples to determine at least one coefficient value. A compensation value is calculated using the at least one coefficient value. The compensation value is then used for correcting the I/Q imbalance in the received signal.

In another embodiment, the method described above is used to correct the received signal for DC offset error.

Before describing in detail the particular method and system for I/Q imbalance and DC offset correction in accordance with the present invention, it should be observed that the present invention resides primarily in combinations of method steps and apparatus components related to method and system for I/Q imbalance and DC offset correction. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

A "set" as used in this document, means a non-empty set (i.e., comprising at least one member). The term "another", as used herein, is defined as at least a second or more. The terms "including" and/or "having", as used herein, are defined as comprising.

It is further understood that the use of relational terms, if any, such as first and second, top and bottom, and the like, are used solely to distinguish one entity or action from another, without necessarily requiring or implying any actual relationship or order between such entities or actions.

FIG. 1 is a block diagram illustrating the processing of a received signal in a communication system, in accordance with an embodiment of the present invention. The signal is received by an antenna 101 and passed on to a band pass filter 102 for processing. The band pass filter 102 passes frequencies in a desired range for further processing and attenuates frequencies below and above the desired range. The received signal is then passed on to a low noise amplifier 104, which amplifies the received signal. The low noise amplifier 104 contributes a least amount of thermal noise to the received signal. The received signal then is processed in a second band pass filter 106, which removes the undesirable frequencies from the received signal. The received signal is then processed in a quadrature mixer 108. The mixer 108 controls the received signal and mixes the received signal with a quadrature local oscillator signal to baseband I/Q signals. These signals are processed at low pass filter 110. The received signals then go through an Analog-to-Digital converter (A/D converter or ADC) 112. The A/D converter 112 resolves the analog received signal into a continuous stream of individual discrete-time sampled data that makes up what is generally referred to as the I/Q data streams. The I/Q data stream is then processed in a digital signal processor (DSP) 114. The DSP 114 corrects the received signal for amplitude and phase imbalance, and DC offset error using the methods described in conjunction with FIG. 2 and FIG. 7.

Figure 2:
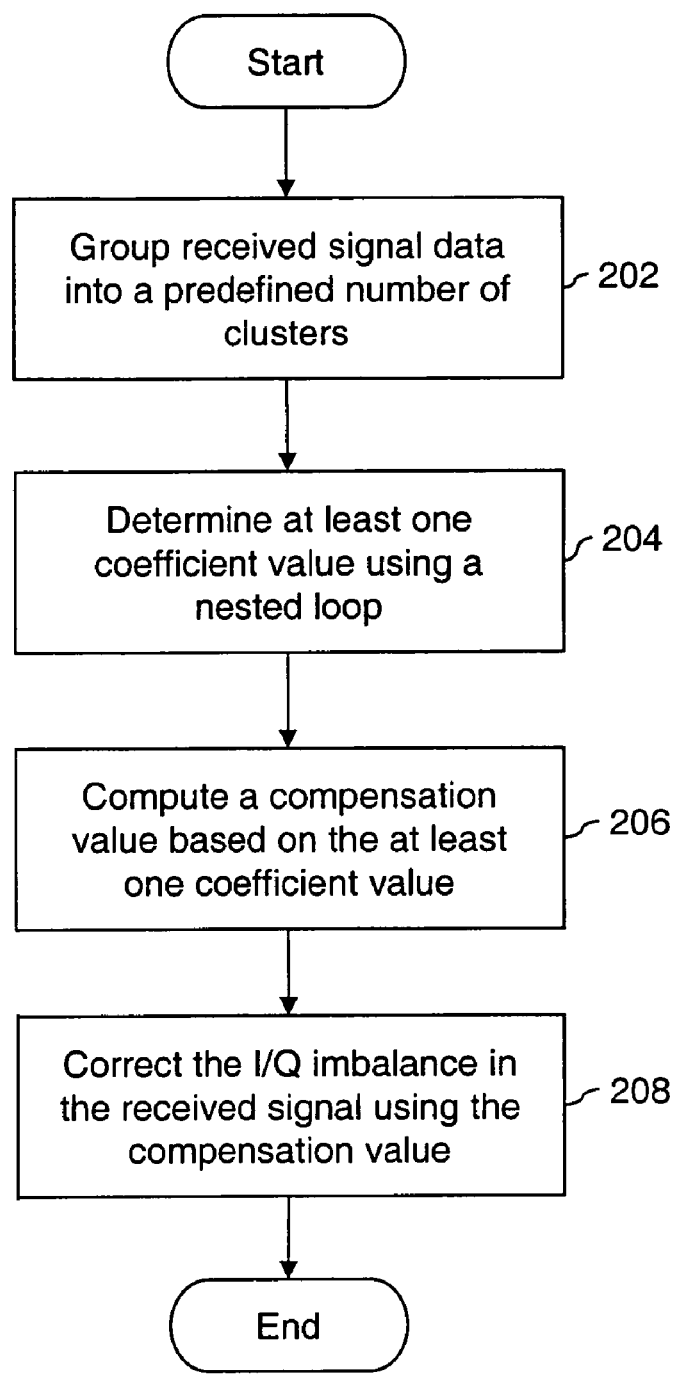
FIG. 2 is a flow chart illustrating a method for correcting I/Q imbalance and DC offset error in a received signal, in accordance with an exemplary embodiment of the present invention.

FIG. 2 is a flow chart illustrating a method for correcting I/Q imbalance and DC offset error in a received signal, in accordance with an exemplary embodiment of the present invention. At step 202, the "stream" of contiguous discrete-time samples of the received signal that is generated by the A/D converter 112, is strategically partitioned to facilitate subsequent coefficient calculations. The I/Q data stream of discrete-time samples is partitioned into a predetermined number of contiguous samples that make up a sample grouping. In various exemplary embodiments of the present invention, the sample grouping is composed of 150 to 200 contiguous discrete-time samples that were generated by the A/D converter by sampling the received signal at a sample rate of 20,000 samples-per-second (20 ksps).

At step 204, a coefficient value is determined by using an appropriate technique in a nested loop processing structure. For I/Q amplitude and phase imbalance, the coefficient values for $I^2$, $Q^2$ and I*Q is determined. For DC offset error, the coefficient value is the "middle value" for the time varying I and Q component. The sample grouping is processed in a nested loop to determine the coefficient value. The nested loop includes one or more concentric loops, with each concentric loop operating on the preceding loop estimates. In an exemplary embodiment of the present invention, the nested loop includes three concentric loops, referred to as a primary loop, a secondary loop and a final loop. The nested loop is described in detail in conjunction with FIGS. 3, 4 and 5. The coefficient value is determined using at least one of: the predetermined number of primary loop estimates, a predetermined number of subsequent successive loop estimates and a final loop estimate.

At step 206, a compensation value for amplitude and phase imbalance ($A_e$ and $\phi$) and DC offset error ($I_{dc}$, $Q_{dc}$) is computed by using the coefficient value. At step 208, the compensation value is used to correct the I/Q imbalance and DC offset error present in the received signal.

The compensation value for DC offset error correction is calculated in real time, by using a technique based on the nested loop. The DC offset error is the difference between the "true middle" point of the time varying I and Q components, and the theoretical "middle" point intrinsic in the demodulator of the DSP 110. For reference purposes, the theoretical middle point for a given demodulator is set to a value of zero. Additionally, the middle point, which becomes the DC compensation value relative to zero, for the discrete-time samples of the I/Q components of the received signal may be found using techniques well known in the art, such as digital integration utilizing the following mathematical relationship:

$$I_{dc}(n) = \sum_n a * I_{dc}(n-1) + b * I(n)$$

and $$Q_{dc}(n) = \sum_n a * Q_{dc}(n-1) + b * Q(n)$$

where $a < 1$ $b = 1 - a$ where "a" must be very small for accurate averaging results that are immune to the received signal modulation. However, the above digital integration technique does not provide results fast enough for real-time compensation with minimum latency in generating demodulated data with very small values of "a". Therefore, to facilitate accurate and fast DC compensation, a Maxima/Minima routine is applied to each sample grouping from step 202 in an embodiment of the invention. The results of said Maxima/Minima routine is provided as an input data to other averaging routines incorporated into subsequent loops.

All the processing using the nested loop structure is performed in step 204, which provides the necessary coefficient values used in the computation of the compensation values in step 206. More detailed description of the averaging estimates and the nested loop structure will be given in subsequent discussion on FIGS. 3, 4 and 5.

The compensation value for I/Q phase and amplitude imbalance is calculated using the I/Q components of the received signal, which have already been corrected for DC offset error. The I/Q amplitude and phase imbalance is determined by using the following error relationship:

Given $I = \cos(\omega t)$ and $Q = A_e \sin(\omega t - \phi)$ where $A_e$=amplitude imbalance; and $\phi$=quadrature phase imbalance.

Then by inspection, amplitude imbalance $$A_e = \sqrt{\frac{Q^2}{I^2}}$$

The phase imbalance $\phi$, is determined using $I^2 = I*I$, $Q^2 = Q*Q$ and I*Q coefficients. After determining the amplitude and phase imbalance coefficients, the compensation values are computed using the following relationship:

$k_1 = A_e \sin(\phi)$ and $k_2 = A_e \cos(\phi)$ where $A_e$ is numeric and $\phi$ is in radians.

The compensated values for I ($I_{comp}$) and Q ($Q_{comp}$) are:

$$I_{comp}=(I-I_{dc})k_2$$

and $$Q_{comp}(Q-Q_{dc})+(I-I_{dc})k_1$$

where $I_{dc}$=DC offset error in I component; and $Q_{dc}$=DC offset error in Q component.

For analog Frequency Modulated (FM) received signals, the $I_{comp}$ and $Q_{comp}$ are post processed through a Bi-Quad de-emphasis filter and demodulated using the arcTan(.) operand.

Figure 3:
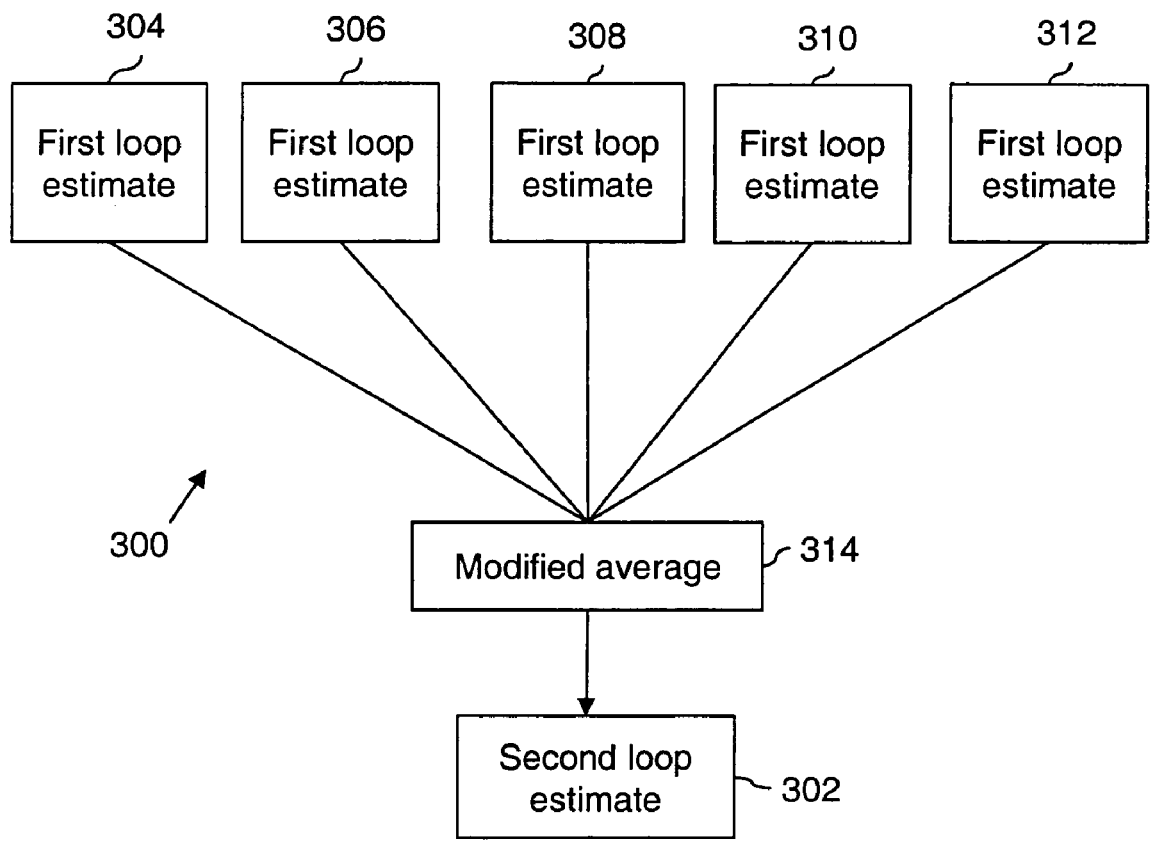
FIG. 3 and FIG. 4 illustrate a flow diagram showing a nested loop, in accordance with an exemplary embodiment of the present invention.
Figure 4:
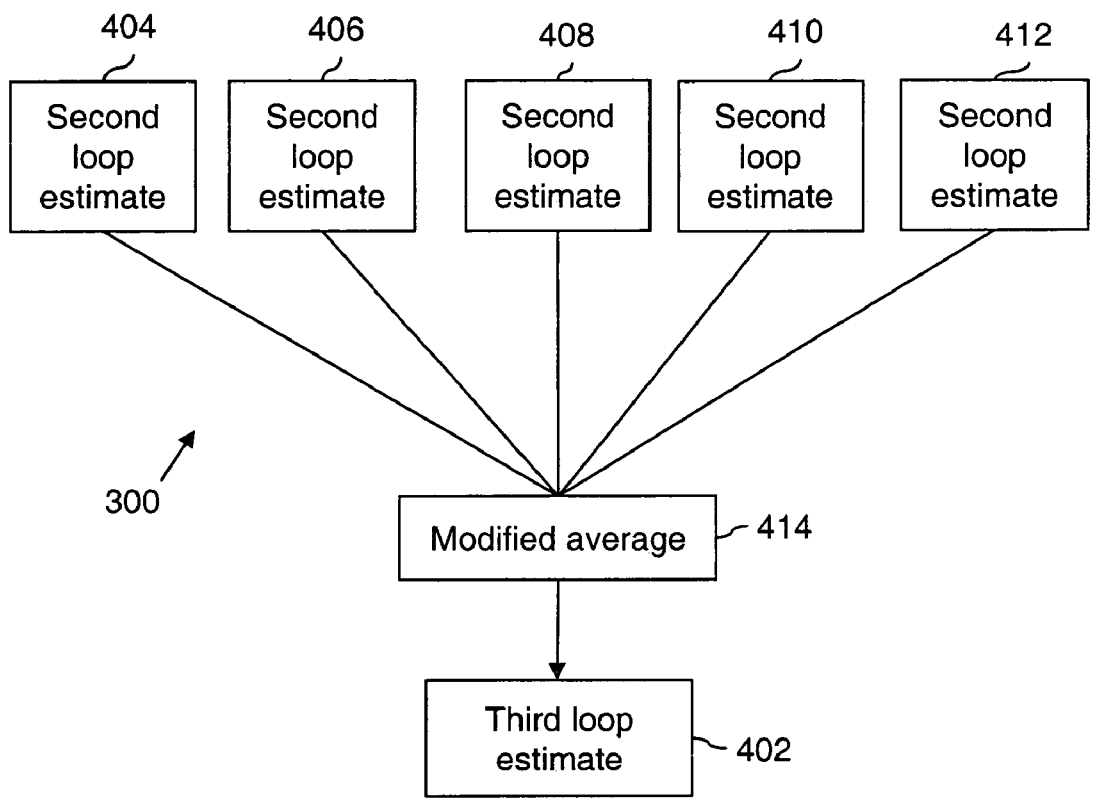

FIG. 3 and FIG. 4 illustrate a flow diagram showing a nested loop 300, in accordance with an exemplary embodiment of the present invention. FIG. 3 shows the computation of a second loop estimate 302, in accordance with an exemplary embodiment of the present invention. The input data to be processed by a first loop is varied depending on which coefficient value is to be calculated; however, the method for determining the coefficient from the first loop is the same for all coefficient values. If the I and Q component amplitude and phase imbalance compensation value is to be determined, then the input data into the first loop is contiguous groupings of values for $I^2$, $Q^2$ and $I*Q$, derived from the contiguous discrete-time samples of the I/Q components. From these groupings of $I^2$, $Q^2$ and $I*Q$ values, a single coefficient values for $I^2$, $Q^2$ and $I*Q$ are generated from which $A_e$ and $\phi$ is determined as previously discussed. If the DC offset error is to be determined, then the input data into the first loop is the contiguous groupings of the discrete-time samples of the I and Q components of the received signal. From these groupings of I and Q samples, a single coefficient value for $I_{dc}$ and $Q_{dc}$ is generated. In order to provide coefficient results quickly, the first loop processes the input data using the following equation:

$$C_1 = \frac{\text{Max}\{X\} + \text{Min}\{X\}}{2}$$

where $C_1$ is a first loop estimate coefficient result and X is contiguous grouping of contiguous discrete-time samples of either I, Q, $I^2$, $Q^2$ or $I*Q$ depending on the desired compensation required.

In various embodiments of the invention, the groupings of the contiguous discrete-time data input into the first loop are of varying lengths. In an embodiment, the number of discrete-time samples for $I^2$, $Q^2$ or $I*Q$ is 150 samples, while the number of discrete-time samples for I or Q used to calculate $I_{dc}$ and $Q_{dc}$ is 200 samples. This predetermined number of samples are processed to get a first loop estimate 304. The first loop estimate 304 is also referred to as a primary loop estimate 304. A compensation value is calculated using the first loop estimate 304 computed for these components. The compensation value is then used for correcting the I/Q imbalance in the received signal.

The real-time duration to accomplish the coefficient calculation is highly dependant on the sample rate and the number of samples in each grouping of the discrete-time samples used to generate the coefficients necessary for determining the compensation values. In an embodiment of the present invention, which utilizes a sample rate of 20,000 samples-per-second (20 ksps), a first loop estimate is calculated in 7.5 ms for groupings of 150 contiguous discrete-time samples (150/20000=0.0075 seconds). For sample groupings of 200 samples, the first loop estimate is calculated in approximately 10 mS for a samples rate of 20 ksps. The real-time duration required to calculate the first loop coefficient values is defined as the first loop iteration period. When the received signal is initially received, and given that initially no estimate is available until at least one first loop iteration period has elapsed, (e.g. 7.5 ms or 10 mS), no compensation value is calculated and no correction is applied on the received signal during this period of time. At the end of the first loop iteration period, a compensation value is calculated by using the first loop estimate 304. This compensation value is used to correct the errors in the received signal.

In subsequent first loop iteration periods, new first loop estimates 306, 308, 310, and 312, are calculated using successive new groups of contiguous discrete-time samples of the I/Q components of the received signal, each grouping having the appropriate predetermined number of samples. For initial compensation when the received signal is first received, or after an adapt is triggered, whenever a new coefficient value is generated from the plurality of first loop estimate 304, 306, 308, 310, and 312, an incremental average 314 of the first loop estimates 304, 306, 308, 310, and 312 is calculated, as they become available in real-time.

For an embodiment, the initial five first loop iterations (shown in FIG. 3), with each first loop iteration period being 7.5 mS (eg: 150 sample groupings), the coefficients results from each first loop estimates 304, 306, 308, 310, and 312 would be available at time 7.5 mS, 15 mS, 22.5 mS, 30 mS, and 37.5 mS respectively. Different groupings of the contiguous discrete-time samples would result in a different first loop iteration period and correspondingly different times of coefficient availability. The number of samples in each group may be selected to optimize accuracy while minimizing processing delays.

As has been previously discussed, upon initial receive or after an adapt is triggered, a predetermined number of first loop estimates is generated and incrementally averaged to compute a new compensation value to correct the received signal. Once this initial receive period or adapt period has elapsed, a predetermined number of first loop estimates is used to compute a second loop estimate 302. The second loop estimate 302 is also referred to as a secondary loop estimate 302. In an embodiment of the present invention, the second loop estimate 302 is a secondary mathematical average of the predetermined number of first loop estimates. An example of the secondary mathematical average 314 (also referred to as the modified average 314) used to calculate the second loop estimate 302 is:

$$C_2 = \frac{\sum_k C_1(k) - \text{Max}\{C_1(k)\} - \text{Min}\{C_1(k)\}}{k-2}$$

Where $C_2$ is the second loop estimate 302, "k" is an integer equal to the number of results from the first loop estimates that are being processed for calculating the second loop estimate 302, and $C_1$ is a group of "k" contiguous coefficient results from the previous sequence of the first loop estimates (eg: 304, 306, 308, 310, and 312). The size of the $C_1(k)$ can vary depending on the coefficient being calculated, and/or accuracy and iteration period requirements.

In an embodiment of the present invention, k=5 and $C_1(k)$ is composed of five first loop estimates which are used to compute the second loop estimate 302. As mathematically described in the previous equation, to calculate the modified average 314, a highest value first loop estimate and a lowest value first loop estimate are removed from the five first loop estimates. Then, an average of the remaining first loop estimates is calculated to generate the second loop estimate 302. In this embodiment, the second loop estimate 302 is generated in 37.5 ms assuming a discrete-time sample rate of 20 ksps and a first loop iteration period of 7.5 mS, for groupings of 150 contiguous discrete-time samples. The second loop estimate 302 is used to compute a compensation value to correct the errors in the received signal.

FIG. 4 shows the computation of a third loop estimate 402, in accordance with an exemplary embodiment of the present invention. A plurality of second loop estimate 404, 406, 408, 410, and 412 are generated, with each second loop estimate being calculated from new contiguous groupings of "k" first loop estimates. It should be noted that each of the plurality of second loop estimate 404, 406, 408, 410, and 412 are equivalent to the second loop estimate 302 (shown in FIG. 3); therefore each of the plurality of second loop estimate are themselves generated from a plurality of first loop estimates (as described in FIG. 3). The real-time duration required to calculate a second loop coefficient value is defined as the second loop iteration period, and is directly dependant on the number of "k" input samples each second loop estimate processes. For an embodiment illustrated in FIG. 3 where k=5, the second loop iteration period is 37.5 ms for a sample rate of 20 ksps and the first loop estimate grouping of 150 contiguous samples. For initial compensation when the received signal is first received, or after an adapt is triggered, whenever a new coefficient value is generated from the plurality of second loop estimates 404, 406, 408, 410, and 412, an incremental average of the second loop estimates 404, 406, 408, 410, and 412 is calculated as they become available in real-time. For the embodiment illustrated in FIG. 4, the initial five second loop iterations, given that each second loop iteration period is 37.5 mS, that the coefficients results from each second loop estimate calculation corresponding to 404, 406, 408, 410, and 412 would be available at time 37.5 mS, 75 mS, 112.5 mS, 150 mS, and 187.5 mS respectively. Different groupings of the contiguous discrete-time samples would result in a different second loop iteration period and correspondingly cause different times of coefficient availability. The number of the first loop estimates used in calculating a second loop estimate may be varied to optimize accuracy while minimizing processing delays. The second loop estimates are the coefficient values used to generate a new compensation value in order to correct the error in the received signal.

As has been previously discussed, upon initial receive or after an adapt is triggered, a predetermined number of second loop estimates is generated, and used to compute a compensation value that is turn are used to correct the errors in the received signal. Once this initial receive period or adapt period has elapsed, a predetermined number of second loop estimates is used to compute the third loop estimate 402. The third loop estimate 402 is also referred to as a tertiary loop estimate 402.

In an embodiment of the present invention, the third loop estimate 402 is a hybrid mathematical average of the predetermined number of second loop estimates Specifically, for third loop estimates, an example of the hybrid mathematical average 414 (also referred to as the modified average 414) is:

$$C_3 = \frac{\text{Max}(C_2(n) - \text{Max}\{C_2(n)\} - \text{Min}\{C_2(n)\}) + \text{Min}(C_2(n) - \text{Max}\{C_2(n)\} - \text{Min}\{C_2(n)\})}{2}$$

where $C_3$ is the third loop estimate 402, "n" is an integer equal to the number of second loop estimates that are being processed to calculate the third loop estimate 402, and $C_2$ is a group of "n" contiguous coefficient results from the previous sequence of the second loop estimates (eg: 404, 406, 408, 410, and 412). The size of the $C_2(n)$ can vary depending on the coefficient being calculated, and/or accuracy and iteration period requirements.

The techniques for calculating a second loop estimate and a third loop estimate are interchangeable, and that additional loop iterations with other averaging techniques can be appended to the output of the third loop estimate 402 using part or combinations of the second or third loop estimate method. For the embodiment illustrated in FIG. 4, n=5, and that a new third loop estimate is available every 187.5 ms for a 20 ksps sample rate and 37.5 mS second loop iteration period.

In an embodiment of the invention, n=5 and $C_2(n)$ is composed of five second loop estimates which are used to compute the third loop estimate 402. While calculating the modified average 414, a highest value second loop estimate and a lowest value second loop estimate are removed from the five second loop estimates. Then, a Maxima/Minima summation, divided-by-two of the remaining three second loop estimates is used to calculate the third loop estimate 402. In this embodiment, the third loop estimate 402 is generated in 187.5 ms. The third loop estimate 402 is used to compute a compensation value that is applied to correct the errors in the received signal for the next 187.5 ms, during which a new third loop estimate is generated. This new third loop estimate is used to generate a compensation value to correct errors in the received signal. In a similar way, third loop estimates are generated and used to correct the errors in the received signal. The nested loop 300 is now said to be operating in a steady state.

Figure 5:
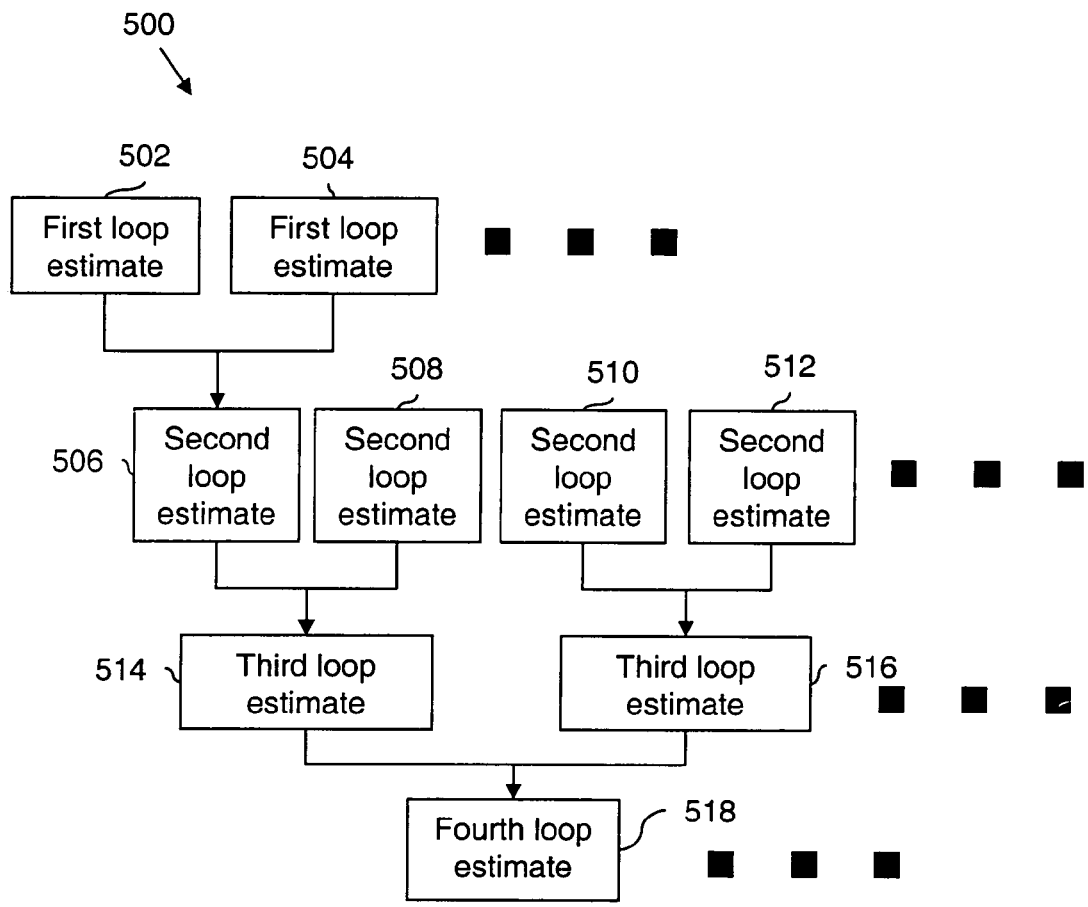
FIG. 5 is a flow diagram illustrating a nested loop, in accordance with another exemplary embodiment of the present invention.

FIG. 5 is a flow diagram illustrating a nested loop 500, in accordance with another exemplary embodiment of the invention. The nested loop 500 includes a plurality of concentric loops similar to the concentric loops in the nested loop 300 (described in conjunction with FIG. 3 and FIG. 4), with each successive loop processing the result of a preceding loop. In an exemplary embodiment of the invention, the nested loop 500 includes four concentric loops. The first loop estimates 502 and 504 are generated using a maxima-minima operation equivalent to that described in FIG. 3; however, there are 250 samples in each grouping of contiguous discrete-time samples of the received signal instead of 150 or 200 samples as previously described. Thus, the first loop iteration period for the nested loop 500 is 12.5 mS for a sample rate of 20 ksps. The outputs of the first loop estimates 502 and 504 are averaged to generate a second loop estimate 506. For this embodiment, it is apparent that the second loop iteration period for the nested loop 500 is 25 mS. For initial receive, or when in adapt, a compensation value is calculated by using the second loop estimate 506. The compensation value is used to correct the errors in the received signal. While not shown, it is implied from FIG. 4 that the subsequent second loop estimates 508 is generated from the first loop estimates subsequent in time to the first loop estimates 502 and 504.

The plurality of second loop estimates 506, 508, 510, and 512 generate coefficient values from groupings of contiguous pairs of first loop estimates, with each second loop estimate coefficient being generated every 25 mS for a 20 ksps sample rate. The second loop estimates 506 and 508 are averaged to generate a third loop estimate 514. For initial receive period, or adapt period, a compensation value is computed using the third loop estimate 514. A plurality of third loop estimates 514, and 516 generate coefficient values from groupings of contiguous pairs of second loop estimates, which defines the third loop iteration period at 50 mS for this embodiment when using a 20 ksps sample rate, Therefore, it is apparent that in the next 50 ms, a third loop estimate 516 is generated by averaging the second loop estimates 510 and 512. The third loop estimates 514 and 516 are then averaged to generate a fourth loop estimate 518; therefore the fourth loop iteration period is 100 mS. The fourth loop estimate 518 is used to compute a new compensation value for correcting the errors in the received signal. All subsequent compensation values are calculated using the fourth loop estimates; therefore, once the compensation values are derived using a fourth loop estimate, the nested loop 500 is said to be in steady state. Hence, a new fourth loop estimate is generated after every 100 ms, and a new compensation value is calculated for correcting the errors in the received signal.

In accordance with the present invention, as illustrated in FIGS. 3, 4 and 5, a set of control parameters and adapt parameters are defined. If the value of one or more of the adapt parameters in the received signal becomes greater than a predetermined threshold, the nested loops 300 and 500 collapses. None of the previously generated first loop estimates, second loop estimates and third loop estimates are used and the nested loops 300 and 500 restarts from the first loop estimate 304 (for the nested loop 300) or the first loop estimate 502 (for the nested loop 500). The adapt sequence is defined as the contiguous sequence of running averages generated from the first loop estimates, the second loop estimates and the third loop estimates or higher order loops, that are used to calculate the compensation values prior to the final steady state coefficient becoming available from the final loop estimate. The final steady state coefficient is the third loop estimate for the nested loop 300 and fourth loop estimate for the nested loop 500. A detailed review of the nested loop control parameters and adapt parameters will be discussed in conjunction with FIG. 7.

Figure 6:
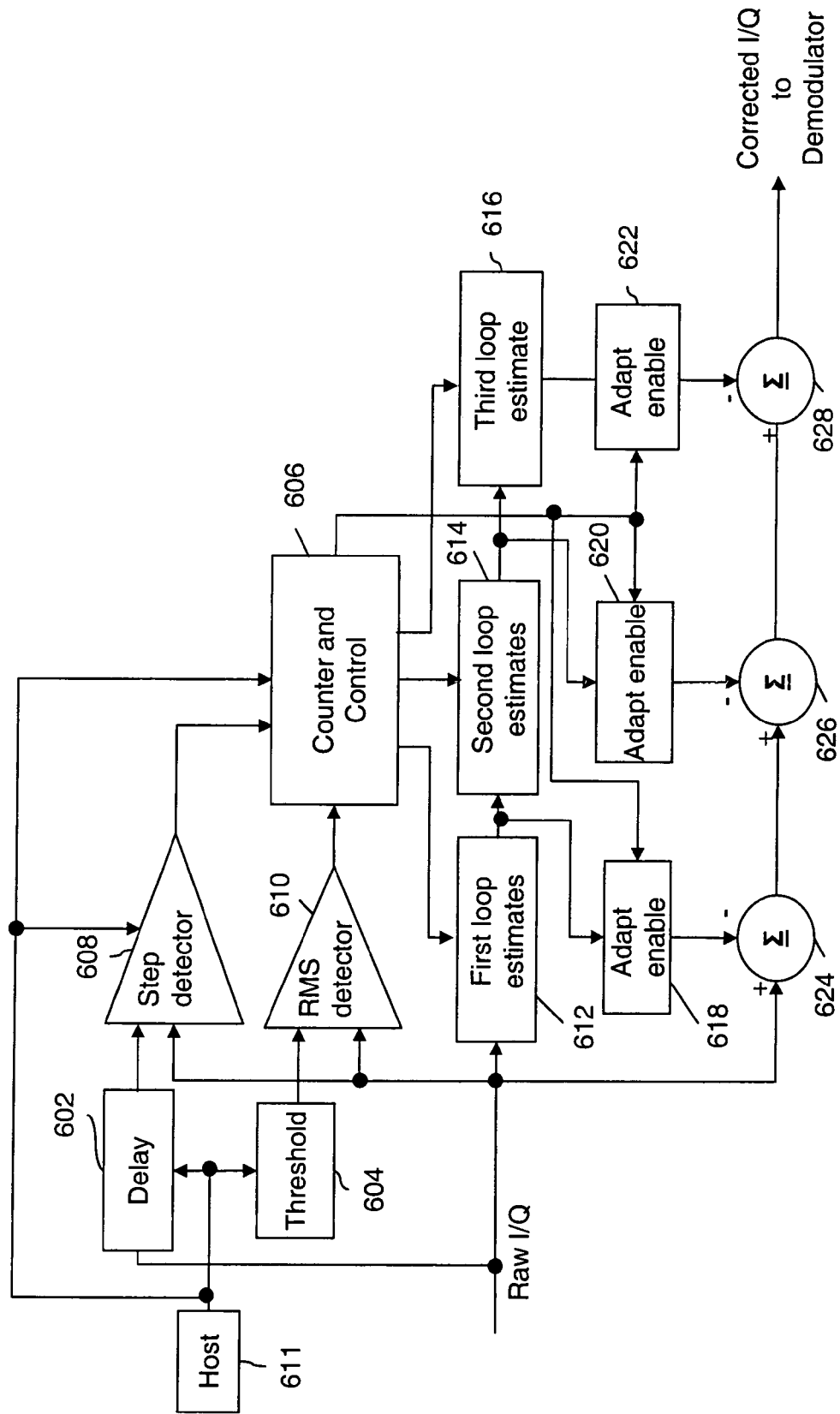
FIG. 6 is a block diagram illustrating the process of controlling the processing of I and Q components, in accordance with an exemplary embodiment of the present invention.

FIG. 6 is a block diagram illustrating the process of controlling the processing of I and Q components, in accordance with an exemplary embodiment of the invention. A delay block 602, a threshold block 604, a counter and control block 606, a step detector 608, and an RMS detector 610 are programmed and controlled by a host micro-processor using a serial peripheral interface (SPI) 611.

The counter and control block 606 controls the number of contiguous samples that are utilized in each grouping of samples subsequently processed to provide the loop estimates, which loop estimate result is used in the calculation of the compensation value for the I/Q component, and when the nested loop represented by a first loop estimate 612, a second loop estimate 614 and a third loop estimate 616 should be collapsed given that the adapt threshold or suspension threshold has been exceeded.

An adapt threshold is defined as a condition that triggers an adapt sequence which includes a radio mode change, defined as a user initiated change in the radio's operating condition, and/or magnitude change in the Received Signal Strength Indicator (RSSI) that exceeds a predefined threshold within a predefined time period. A suspension threshold is defined as a predefined threshold at very weak RSSI or at very strong RSSI levels where compensation values for the amplitude and phase imbalance, or dc offset error are held constant at the previous legacy compensation value, and the newer compensation values generated by the nested loop is ignored or "suspended"; however, the nested loop is not necessarily collapsed. A radio mode change is easily detected by the radio's micro-processor, which in turn is used to trigger an adapt sequence. To trigger an RSSI dependant adapt sequence, RSSI variations within a predefined time period are compared against a predefined threshold.

To make the determination for a RSSI dependant adapt, delayed samples of the received signal, provided by the delay block 602, are compared to the in-time sampled data of the received signal in the step detector 608. If the magnitude difference between the time-delayed sample and the real-time sample exceeds a predefined threshold (as set via the Host/SPI 611), the step detector 608 outputs a first control signal to the counter and control block 606 that will trigger an adapt sequence, resulting in the collapse and restart of the nested loop. The duration of the time delay in the delay block 602 is programmable via the SPI 611.

In an embodiment of the invention, the RMS detector 610 provides an indication of the absolute RSSI level. The absolute magnitude of the discrete-time sample data is compared to a predefined level provided by the threshold block 604. The threshold block 604 contains the suspension threshold value(s), which are set via the SPI 611. If the RMS detector 610 determines that the in-time received signal, is more than a predetermined suspension threshold, a second control signal is sent to the counter and control block 606 that will cause the compensation values for the amplitude and phase imbalance, or dc offset error to be held constant at the previous legacy compensation value, and the newer compensation values generated by the nested loop is ignored or "suspended". The second control signal from the RMS detector 610 will not necessarily cause the nested loop to be collapsed.

The first loop estimate 612 is representative of the first loop estimates 304, 306, 308, 310, and 312 (shown in FIG. 3), or 502, 504, and other implied first loop estimates (shown in FIG. 5). The second loop estimate 614 is representative of the second loop estimates 404, 406, 408, 410, and 412 (shown in FIG. 4), or 506, 508, 514, 516 and other implied second loop estimates (shown in FIG. 5). The third loop estimate 616 is representative of the third loop estimate 402 (shown in FIG. 4), or 510, 512 and other implied third loop estimates (shown in FIG. 5). For brevity purposes, the fourth loop estimate 518 (shown in FIG. 5) is not illustrated in FIG. 6; however, the fourth loop estimate can be easily appended to the output of the third loop estimate 616 and incorporated into the counter and control block 606 control strategy without departing from the scope and spirit of the present invention.

The counter and control block 606 controls the number of contiguous discrete-time samples in each sample group that is subsequently processed into coefficient values as previously described. When an adapt sequence is triggered, the control and counter block 606 routes the output of the first loop estimate 612 through the adapt enable block 618, providing a running average compensation value from the first loop estimates that is used to correct the raw I/Q data sequence at a summation block 624.

Once the initial second loop iteration period has elapsed, the control and counter block 606 stops compensation at the adapt enable block 624, and routes the output of the second loop estimate 614 through the adapt enable block 620, providing a running average compensation value from the second loop estimates that is used to correct the raw I/Q data sequence at a summation block 626.

Once the initial third loop iteration period has elapsed, the control and counter block 606 stops compensation at the summation block 626, and routes the output of the third loop estimate 616 through an adapt enable block 622, providing a compensation value from the third loop estimate that is used to correct the raw I/Q data sequence at a summation block 628.

If the third loop estimate is the final loop estimate, the loop is said to have reached steady state, with each successive third loop estimate being used to compensate the raw I/Q data sample from the received signal. After the loop has reached steady state, all I/Q compensation is done at the summation block 628, with compensation values at the summation blocks 624 and 626 being set to zero (disabled).

The compensation value is set at the adapt enable blocks 618, 620 and 622, which are controlled by the counter and control block 606. As will be described in detail in FIG. 7, the actual compensation value provided by the adapt enable blocks 618, 620 or 622 can be the true compensation value calculated from the nested loop coefficients, or can be modified in a predetermined manner. If the suspension threshold is triggered, the counter and control block 606 forces the compensation coefficient provided by the adapt enable block 622 to be held constant at the last valid legacy compensation value (compensation values at the adapt enable blocks 618 and 620 are set to zero). Once the suspension threshold signal provided by the RMS detector 610 is cleared, the counter and control block 606 allows the resumption of in-time compensation values provided at the adapt enable block 622. A detailed review of the adapt threshold, suspension threshold, and other nested-loop control parameters has been described in conjunction with FIG. 7.

Figure 7:
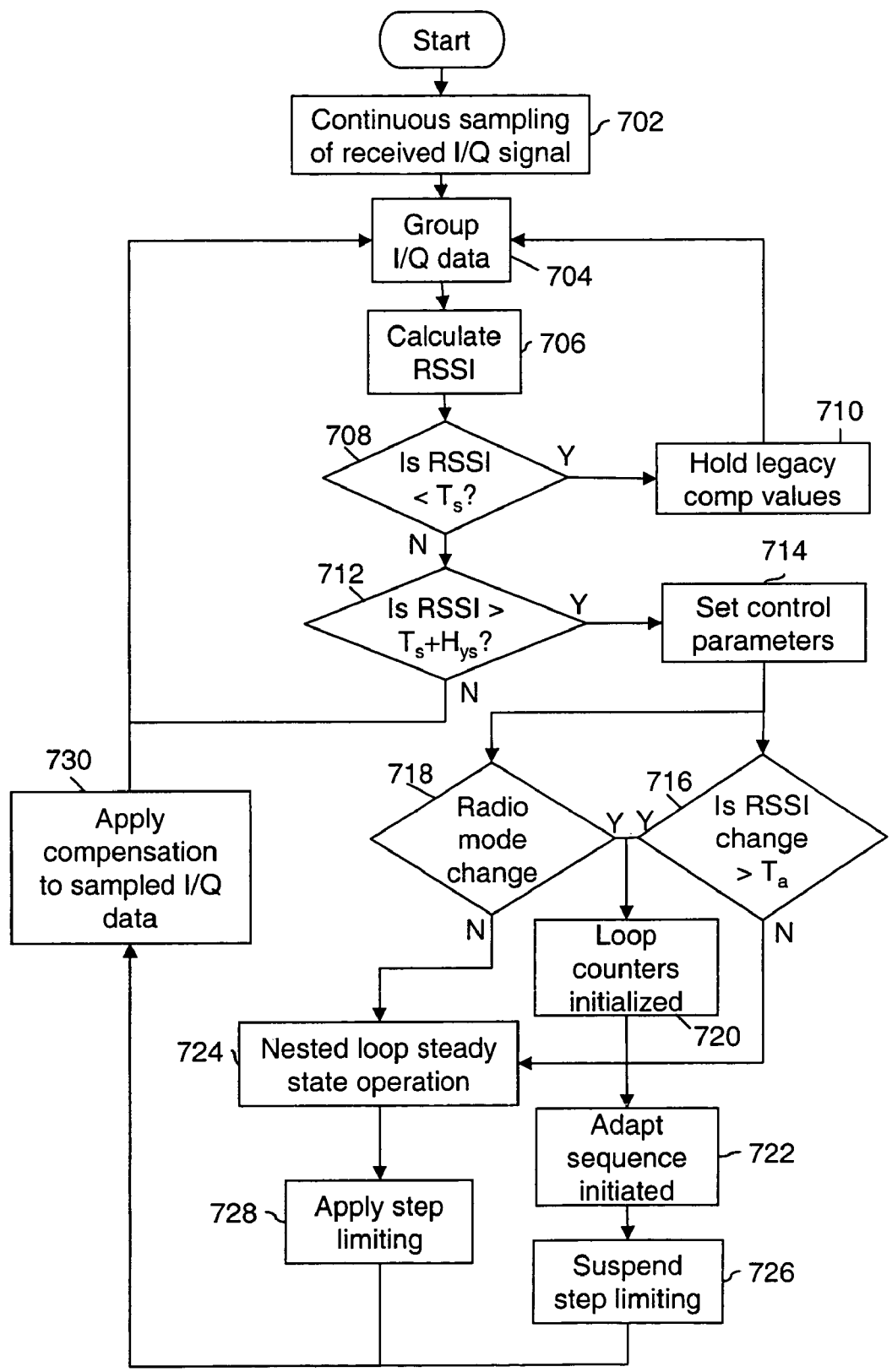
FIG. 7 illustrates a flow chart for implementing the I/Q imbalance correction technique in a Digital Signal Processor (DSP), in accordance with the present invention.

FIG. 7 illustrates a flow chart for implementing the I/Q imbalance correction technique incorporated in the Digital Signal Processor (DSP) 114, in accordance with the present invention. At step 702, the I/Q components of the received signal is continuously sampled. At step 704, the received signal is partitioned into contiguous groupings dependant on the coefficient to be calculated. The Received Signal Strength Indication (RSSI) for the received I and Q samples is calculated at step 706 and subsequently compared against a suspension threshold (Ts) at step 708. At step 708, if the RF signal is determined to be below a predefined threshold, the compensation values are held at step 710 and the decision metric is looped back to processing the input received signal at step 704. If at step 708, it is determined that the RSSI exceeds Threshold $T_s$, the received signal RSSI is compared against a hysterisis value $(T_s+H_{ys})$ at step 712. If the signal does not exceed the hysterisis value of $T_s+H_{ys}$, then the compensation is held constant and the decision metric is again looped back to processing the input received signal at step 704. If however, the RSSI is of sufficient level to resume compensation calculation, the control parameters are set at step 714 prior to resuming compensation calculations and corrections.

Given that the RF level is above the predetermined value at step 712, and that the control parameters are set at step 714, then the received I and Q signals are compared against a second threshold, the adapt step threshold $T_a$ at step 716. The radio operating mode is also verified in step 718 in parallel to step 716 to ensure that no change in operating mode has occurred. Should either a change in radio operating mode be detected in step 718, or a RSSI step of size exceeding adapt the threshold $T_a$ be detected in step 716, then the loop counters are initialized at step 720 and the adapt sequence is initiated at step 722. Should neither a change in radio mode occur at step 718 or RSSI step be detected at step 716, then the nested loop sequence is set to nominal steady state operation at step 724 where the compensation values are calculated from the final loop estimates and post-process application of step limiting at step 728 to ensure compliance to the appropriate control parameters. The compensation values are applied to the sampled I/Q received signal at step 730.

If an adapt sequence is initiated at step 722, the average of the various loop estimates are generated using the first, second and possibly third loop estimates, with no constraints on the compensation values being applied (i.e. suspending step limiting at step 726). Again the compensation values are applied at step 730 whether said estimates are calculated in the steady state nested loop or during the adapt. This sequence is continuously repeated to provide delayed-time compensation of the sampled receive signal, where the delay is very small and for all practical purposes appears to be real-time compensation to the radio user.

The set of control parameters used to control the steady state loop response or adapt response include a step limit for the amplitude imbalance change, a step limit for the phase imbalance change, and a step limit for the dc offset error change. These parameters are used to minimize excessive excursions in the compensation calculation that can be erroneously induced by the dynamic RF environment in which the received signal is transmitted and are incorporated into step 728. The difference between the previous amplitude imbalance coefficient value $A_e(t-1)$, and the newest amplitude imbalance coefficient value $A_e(t)$, is defined as the amplitude imbalance step limit. The difference between the previous phase imbalance coefficient value $\phi(t-1)$ and the newest phase imbalance coefficient value $\phi(t)$ is defined as the phase imbalance step limit. The difference between the present I/Q dc offset error compensation value and the newest dc offset error compensation value is defined as the dc offset error step limit. For an embodiment, the amplitude imbalance step limit, phase imbalance step limit, and dc offset error step limit may be variable, and are selected to provide improved accuracy of the compensation values. In an embodiment, the amplitude imbalance step limit, phase imbalance step limit, and dc offset error step limit are set to 0.1 dB, 0.25 degrees, and 10 decimal units respectively. The dc offset error step limit is specified relative to the unit-less output range of the ADC, because the dc offset error is set by the specific characteristics of the receiver, which include, but is not limited to, total receiver gain, Signal-to-Noise Ratio (SNR) of the received signal at the ADC input, and ADC sample resolution.

The set of adapt parameters that can trigger an adapt sequence include a radio mode change defined as a user initiated change in the radio's operating condition, and/or magnitude change in the Received Signal Strength Indicator (RSSI) that exceeds a predefined threshold within a predefined time period. A radio mode change for step 718 includes, but is not limited to, the initial power up sequence, a change in the receiver operation frequency (eg: channel change), a change from receive channel bandwidth (eg: change channel spacing), a change from transmit mode to receive mode, or a dynamic scan of multiple receiver channels in a predetermined sequence of fast transitions (eg: scan). The initiation of each of these modes in step 718 would trigger the collapse of the nested loop and an initiation of an adapt sequence for amplitude and phase imbalance, and do offset error compensation as initiated at step 720.

Given that a radio mode change is not initiated, an adapt of the compensation values can still occur. In an exemplary embodiment of the present invention, the amplitude and phase imbalance nested loop is adapted when the RSSI varies from weak signal to strong signal conditions, and the magnitude of the change exceeds a predetermined threshold, say 20 dB, in first loop iteration period for coefficient A/φ at step 716. In an exemplary embodiment of the present invention, the dc offset error nested loop is adapted when the RSSI varies from strong signal to weak signal condition, and the magnitude of the change exceeds a predetermined threshold, say 30 dB, in first loop iteration period for coefficient $I_{dc}/Q_{dc}$ at step 716. The threshold of RSSI change needed to trigger an adapt may be variable, and the adapt controls for Amplitude/Phase imbalance, and dc offset error can be independent or slaved to each other.

As has been previously discussed, the present embodiment also incorporates a suspension threshold decision step 708. The suspension threshold is defined as a threshold at very weak RSSI or at very strong RSSI levels where the compensation values for the amplitude and phase imbalance, or dc offset error are held constant at the previous legacy compensation value, and the newer compensation values generated by the nested loop is ignored or "suspended". The legacy compensation values are utilized as long as the RSSI exceeds the suspension threshold plus a predefined hysterisis value as illustrated in step 712. The hysterisis value prevents chatter, where chatter is defined as the condition where the new compensation values are cyclically engaged and disengaged in an uncontrolled manner should the RSSI level persist at a constant level near the suspension threshold. For example, the suspension threshold ($T_s$) can be set to an RSSI level correlated to −110 dBm and the hysterisis is set to 5 dB. Both the threshold and hysterisis may be variable, and can be selected based on a specific characteristic of the received signal.

It will be appreciated that some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It should be clear from the preceding disclosure that the present invention provides a method that corrects I/Q imbalance and DC offset error in a received signal continuously and in real time. The correction method of the present invention operates piece-wise continuously on the received signal and does not require any pilot signal, sync-symbols of known amplitude or phase calibration. The method provides a compensation strategy, which takes into account a highly dynamic RF environment, such as temperature and regulator tolerances. The adaptive averaging scheme and collapsible nested loop address these variations. Moreover, the use of nested loop allows the compensation value to be generated from any of the concentric loops, thereby allowing for faster and accurate compensations in the received signal.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of correcting in-phase/quadrature-phase (I/Q) imbalance present in a received signal, the method comprising:
   resolving the received signal into a predetermined number of samples;
   determining at least one coefficient value using a nested loop, the nested loop having the predetermined number of samples as an input, the nested loop comprising at least two loops, wherein determining the at least one coefficient value using the nested loop comprises:
      computing a predetermined number of primary loop estimates based on the predetermined number of samples;
      computing a predetermined number of secondary loop estimates based on the predetermined number of primary loop estimates;
      computing a predetermined number of subsequent successive loop estimates from a plurality of preceding loops within the nested loop, wherein the predetermined number of subsequent successive loop estimates is based on a predetermined number of preceding loop estimates;
      computing a final loop estimate based on the predetermined number of preceding loop estimates;
      determining the at least one coefficient value using at least one of: the final loop estimate, the predetermined number of subsequent successive loop estimates, and the predetermined number of primary loop estimates; and
   computing a compensation value based on the at least one coefficient value; and
   correcting the I/Q imbalance in the received signal using the compensation value.

2. The method according to claim 1, wherein each of the predetermined number of primary loop estimates is a mathematical average, wherein the mathematical average is determined from the predetermined number of samples.

3. The method according to claim 1, wherein each of the predetermined number of secondary loop estimates is a secondary mathematical average of the predetermined number of primary loop estimates.

4. The method according to claim 1, wherein each of the predetermined number of successive loop estimates from the plurality of loops is a hybrid mathematical average of the predetermined number of preceding loop estimates.

5. The method according to claim 1, wherein the final loop estimate is a mathematical average of the predetermined number of preceding loop estimates.

6. The method according to claim 1 further comprising:
  collapsing the nested loop if an adapt parameter of the received signal exceeds a predetermined threshold; and
  rebuilding the nested loop.

7. The method according to claim 6, wherein the adapt parameter is at least one of: a step size threshold, a hysteresis, a step limit amplitude imbalance change, a step limit phase imbalance change, and a maximum direct current (DC) change of the received signal.

8. The method according to claim 1, wherein the step of determining the at least one coefficient value comprises calculating amplitude imbalance using the relationship:

$$A = \sqrt{\frac{f(Q^2)}{f(I^2)}}$$

where $f(I^2)$, $f(Q^2)$ is defined as an arithmetic function $f(x)$ operating on the square of the quadrature components I and Q.

9. The method according to claim 1, wherein determining the at least one coefficient value using the nested loop comprises:
  computing a predetermined number of first loop estimates, wherein each of the predetermined number of first loop estimates is based on the predetermined number of samples;
  computing a predetermined number of second loop estimates, wherein each of the predetermined number of second loop estimates is based on the predetermined number of first loop estimates;
  computing a third loop estimate, wherein the third loop estimate is based on the predetermined number of second loop estimates; and
  determining the at least one coefficient value using at least one of the predetermined number of first loop estimates, the predetermined number of second loop estimates and the third loop estimate.

10. The method according to claim 9, wherein each of the predetermined number of first loop estimates is a mathematical average of a maximum value parameter and a minimum value parameter, wherein the maximum value parameter and the minimum value parameter are determined from the predetermined number of samples.

11. The method according to claim 9, wherein each of the predetermined number of second loop estimates is a mathematical average of the predetermined number of first loop estimates.

12. The method according to claim 9, wherein the third loop estimate is a mathematical average of the predetermined number of second loop estimates.

13. The method according to claim 9, wherein computing each of the predetermined number of second loop estimates comprises:
  removing a highest value first loop estimate from the predetermined number of first loop estimates;
  removing a lowest value first loop estimate from the predetermined number of first loop estimates; and
  calculating a mathematical average of a set of remaining first loop estimates in the predetermined number of first loop estimates.

14. The method according to claim 9, wherein computing the third loop estimate comprises:
  removing a highest value second loop estimate from the predetermined number of second loop estimates;
  removing a lowest value second loop estimate from the predetermined number of second loop estimates; and
  calculating a mathematical average of a set of remaining second loop estimates in the predetermined number of second loop estimates.

15. The method according to claim 9, wherein an incremental average of the first loop estimates is used in computing the compensation value.

16. The method according to claim 9, wherein an incremental average of the second loop estimates is used in computing the compensation value.

17. The method according to claim 9 further comprising:
  collapsing the nested loop if an adapt parameter of the received signal exceeds a predetermined threshold; and
  rebuilding the nested loop.

18. The method according to claim 17, wherein the adapt parameter is at least one of: a step size threshold, a hysteresis, a step limit amplitude imbalance change, a step limit phase imbalance change, and a maximum Direct Current (DC) change of the received signal.

19. The method according to claim 17, wherein the predetermined threshold is based on at least one of: strength of the received signal and noise level present in the received signal.

20. The method according to claim 1, wherein the method is used to correct DC offset error in the received signal.

21. A method of correcting I/Q imbalance in a received signal, the method comprising:
  resolving the received signal into a predetermined number of samples;
  applying the predetermined number of samples to a nested loop;
  resolving the predetermined number of samples into a set of parameters corresponding to I and Q;
  computing a predetermined number of first loop estimates, wherein each of the predetermined number of first loop estimates is based on the set of parameters corresponding to I and Q;
  computing a predetermined number of second loop estimates, wherein each of the predetermined number of second loop estimates is based on the predetermined number of first loop estimates;
  computing a third loop estimate, wherein the third loop estimate is based on the predetermined number of second loop estimates;
  computing a compensation value based on at least one of the predetermined number of first loop estimates, the predetermined number of second loop estimates and the third loop estimate; and
  correcting the I/Q imbalance in the received signal using the compensation value.

22. The method according to claim 21 further comprising:
  collapsing the nested loop if an adapt parameter of the received signal exceeds a predetermined threshold; and
  rebuilding the nested loop.

23. The method according to claim 22, wherein the adapt parameter is selected from a group of parameters consisting of a step size threshold, a hysteresis, a step limit amplitude imbalance change, a step limit phase imbalance change, and a maximum DC change of the received signal.

24. The method according to claim 21, wherein determining the compensation value comprises the step of determining at least one coefficient value from at least one of the predetermined number of first loop estimates, the predetermined number of second loop estimates and the third loop estimate and calculating amplitude imbalance using the relationship $$A = \sqrt{\frac{f(Q^2)}{f(I^2)}}$$

where $f(I^2)$, $f(Q^2)$ is defined as an arithmetic function $f(x)$ operating on the square of the quadrature components I and Q.

25. The method according to claim 21, wherein the method is used to correct DC offset error in the received signal.

* * * * *